(12) United States Patent
Kato et al.

(10) Patent No.: US 7,166,238 B2
(45) Date of Patent: Jan. 23, 2007

(54) LIQUID-CRYSTALLINE IONIC CONDUCTOR AND METHOD FOR PRODUCING THE SAME

(75) Inventors: Takashi Kato, Kanagawa (JP); Kiyoshi Kanie, Miyagi (JP); Masafumi Yoshio, Kanagawa (JP); Hiroyuki Ohno, Tokyo (JP); Masahiro Yoshizawa, Tokyo (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 11/225,000

(22) Filed: Sep. 14, 2005

(65) Prior Publication Data

US 2006/0011887 A1    Jan. 19, 2006

Related U.S. Application Data (63) Continuation of application No. 10/473,673, filed as application No. PCT/JP02/03262 on Apr. 1, 2002, now abandoned.

(30) Foreign Application Priority Data

Mar. 30, 2001 (JP) .............................. 2001-102386
Jan. 21, 2002 (JP) .............................. 2002-012234

(51) Int. Cl.
C09K 19/52 (2006.01)
C09K 19/58 (2006.01)
H01M 6/16 (2006.01)

(52) U.S. Cl. ..................... 252/299.01; 252/299.2; 252/299.3; 429/306; 429/324; 429/336; 429/339

(58) Field of Classification Search ........... 252/299.01, 252/62.2, 299.3, 299.5, 299.61, 299.2; 429/304, 429/306, 324, 336, 339

See application file for complete search history.

(56) References Cited

U.S. PATENT DOCUMENTS

| 6,413,447 B1 | 7/2002 | Sugino et al. |
| 6,495,067 B1 | 12/2002 | Ono |
| 6,580,026 B1 | 6/2003 | Koyanagi et al. |
| 6,627,099 B1 | 9/2003 | Ono et al. |
| 6,727,023 B1 | 4/2004 | Ono |
| 6,849,797 B1 | 2/2005 | Koyanagi et al. |

FOREIGN PATENT DOCUMENTS

| JP | 2000-297085 | 10/2000 |
| JP | 2000-344779 | 12/2000 |
| JP | 2001-15182 | 1/2001 |
| JP | 2001-202995 | 7/2001 |
| JP | 2002-170426 | 6/2002 |

*Primary Examiner*—Shean C Wu
(74) *Attorney, Agent, or Firm*—Wenderoth, Lind & Ponack, L.L.P.

(57) ABSTRACT

A novel liquid-crystalline ionic conductor, which is useful in the electric, electronic, chemical and bioengineering fields, as an anisotropic reaction solvent, ionic conductor, electric field-responsible conductor or the like, and a method for producing the same, is provided. The liquid-crystalline ionic conductor is obtained by mixing an organic molten salt with a-liquid-crystalline organic molecule or a liquid-crystalline inorganic molecule, which comprises a moiety miscible to the organic molten salt and a moiety that shows liquid-crystalline orientation, thereby forming a liquid-crystalline ionic conductor, wherein the organic molten salt is assembled to the liquid-crystalline molecule.

9 Claims, 7 Drawing Sheets

IONIC CONDUCTIVITY IN DIRECTION PARALLEL TO SMECTIC LAYER ($\sigma_{i//}$)

IONIC CONDUCTIVITY IN DIRECTION PERPENDICULAR TO LAYER ($\sigma_{i\perp}$)

LIQUID-CRYSTALLINE IONIC CONDUCTOR AND METHOD FOR PRODUCING THE SAME

This application is a Continuation application of Ser. No. 10/473,673, filed Dec. 29, 2003, which is a 371 application of PCT/JP02/03262, filed Apr. 1, 2002.

TECHNICAL FIELD

The invention of the present application relates to a liquid-crystalline ionic conductor and a method for producing the same. More specifically, the invention of the present application relates to a novel liquid-crystalline ionic conductor which is useful as an anisotropic reaction solvent, an ionic conductor, an electric field-responsive conductor or the like in various field such as the electric, electronic, chemical and bioengineering fields, and a method for producing the same.

BACKGROUND ART

Organic molten salt, which is an ionic liquid, is a liquid that is thermally, chemically and electrochemically stable, is made only of ions, cations and anions and show high ionic conductivity. It also shows excellent qualities such as incombustibility, nonvolatile, low solubility to water and organic solvent. Further, since there is a diverse combination of cations and anions, various organic molten salts and their applications have been reported so far.

For example, an organic molten salt designed so that a catalyst is easily dissolved therein, which enables the extraction of the product by simple separation procedures following the reaction, since the catalyst selectively migrates to the organic molten salt layer, has been reported. This method utilizes the low solubility of the organic molten salt to organic and aqueous layers, which thus enables the recovery and reuse of expensive catalysts.

Further, since the organic molten salt is a liquid on its own and shows fluidity, a technologies such as the formation of organic molten salt into a film while maintaining its conductivity have been studied. Thus, the organic molten salt has also attracted much interest in the electrochemical field, and due to its high conductivity, its use as a new age-electrolyte is being expected.

However, the foregoing organic molten salt was used merely as a reaction solvent, and even for its application in the electrochemical field, only its conductivity in the isotropic field has been evaluated. Thus, the range of its application has been greatly limited.

Thus, the invention of the present application has been made under these circumstances, and its aim is to provide, upon solving the problems of the prior art, a novel liquid-crystalline ionic conductor which is useful as an anisotropic reaction solvent, ionic conductor, electric field-responsible conductor or the like, in fields such as the electric, electronic, chemical and bioengineering fields, as well as a method for producing such liquid-crystalline ionic conductor.

DISCLOSURE OF INVENTION

Thus, the invention of the present application provides the following inventions to solve the foregoing problems.

That is, the invention of the present application provides firstly, a liquid-crystalline ionic conductor, comprising an organic molten salt and a liquid-crystalline molecule, which are mixed and assembled; secondly, the liquid-crystalline ionic conductor, wherein the organic molten salt is assembled between layers of the liquid-crystalline molecules; and thirdly, the liquid-crystalline ionic conductor, which is in the form of a cell or an oriented cell.

Further, the present invention fourthly provides the liquid-crystalline ionic conductor of any of the foregoing aspects of the invention, wherein the liquid-crystalline molecule comprises a moiety that is miscible to the organic molten salt and a moiety that shows liquid-crystalline orientation.

Fifthly, the present invention provides the liquid-crystalline ionic conductor of any of the foregoing aspects of the invention, which form a smectic structure, and sixthly, the present invention provides the liquid-crystalline ionic conductor of any of the foregoing aspects of the invention, which form a columnar structure or a cubic structure.

Further, the invention of the present application provides seventhly, a method for producing the aforementioned liquid-crystalline ionic conductor, which comprises mixing an organic molten salt with a liquid-crystalline molecule; eighthly, the method for producing a liquid-crystalline ionic conductor, wherein the organic molten salt and the liquid-crystalline molecule are each dissolved in an organic solvent and mixed in the form of a solution; ninthly, the method for producing a liquid-crystalline ionic conductor, wherein a cell or an oriented cell is formed; and tenthly, the method for producing a liquid-crystalline ionic conductor, wherein the organic molten salt is an imidazolium-type molten salt.

Moreover, the invention of the present application eleventhly provides the method for producing a liquid-crystalline ionic conductor, wherein the liquid-crystalline molecule forms a smectic structure; and twelfthly provides the method for producing a liquid-crystalline ionic conductor, wherein the liquid-crystalline molecule forms a columnar structure or a cubic structure.

BEST MODE FOR CARRYING OUT THE INVENTION

The invention of the present application has the foregoing characteristics; hereinafter their embodiments are described.

The inventors of the present application have focused on the fact that anisotropy, electric field responsiveness and self-assembling property ascribable to liquid-crystalline properties can be realized for organic molten salt, while maintaining qualities such as conductivity that are inherent to organic molten salt, when given liquid-crystalline properties.

Recently, organic molten salts that exhibit liquid-crystalline properties on its own have been reported by several groups including that of K. R. Seddon et al. However, these were all limited to salts having a simple structure with a long-chain alkyl group, and their ionic conductivities were not measured. Furthermore, their number is extremely small compared to the total number of organic molten salts. This indicates that for the development of liquid-crystalline properties in a single organic molten salt, designing and synthesizing the desired organic molten salt is difficult. That is, although various applications are expected of liquid-crystalline organic molten salt, there is a limit to its realization using liquid-crystalline organic molten salt compounds alone.

Thus, the inventors of the present application have assiduously conducted investigations in view of imparting liquid-crystalline characteristics to organic molten salts, and have consequently accomplished the invention of the present application. That is, the liquid-crystalline ionic conductor provided by the invention of the present application comprises an organic molten salt and a liquid-crystalline molecule mixed to form an assembly, and for its production, an organic molten salt and a liquid-crystalline molecule are mixed to form a liquid crystalline phase.

As the organic molten salt (ionic liquid), various compounds may be used. Specifically, for example, organic molten salts in which cation structures such as imidazolium cation, pyridinium cation, pyrrolidinium cation, ammonium cation, phosphonium cation and sulfonium cation represented by the following formulas are combined with anions such as $C_1^-$, $Br^-$, $I^-$, $NO_3^-$, $BF_4^-$, $PF_6^-$, $AsF_6^-$, $TFSI^-$ and the like may be exemplified.

(In the formula R, $R^I$, $R^{II}$ and $R^{III}$ may be the same or different, and represent an alkyl group, a perfluoroalkyl group, a halogen group, a nitro group or a cyano group.)

Further, organic molten salts having chirality in the molecule may be applied. Especially, an imidazolium-type molten salt, which is known to be stable in ambient atmosphere and low in moisture absorption, which also has a wide potential window as well as a high ionic conductivity, may be listed as a preferable example.

In the invention of the present application, a liquid-crystalline molecule having a moiety that is miscible with the organic molten salt and a moiety that shows liquid crystal orientation may be used as the liquid-crystalline molecule. Although the liquid-crystalline molecule may be a polymer with a molecular weight of more than 10,000 or a small molecule with a molecular weight of less than or equal to several hundred, preferable are small molecules. Further, the liquid-crystalline molecule may be an inorganic substance or an organic substance.

The miscible moiety is a moiety that physically bonds to the organic molten salt, and such bond is formed by self-assembly. Thus, the miscible moiety may be any moiety as long as it exhibits miscibility to the organic molten salt used. Specifically, those represented by the following chemical formulas may be listed.

(In the formula R represents an alkyl group, and X and Y represent any one of OH, COOH, NH$_2$, SO$_3$H and PO$_4$H.)

Further, in the liquid-crystalline molecule used in the invention of the present application, as the liquid crystal orientation moiety, those that exhibits liquid-crystalline properties such as anisotropy and electric field responsiveness when it is physically bonded to the organic molten salt may be used. The liquid-crystalline molecule may be a molecule that does or does not exhibit liquid-crystalline properties on its own. Specifically, as such liquid crystal orientation moiety, those represented by the following chemical formulas may be exemplified.

(In the formula p represents 0 to 2, X represents a substituent, and Y and Z my be the same or different and represent a carbon chain which may contain a single bond, a double bond or a triple bond.)

These liquid crystal orientation moieties form a nematic phase, a smectic phase, a hexagonal columnar phase or a cubic phase.

In the above described liquid-crystalline molecule, the miscible moiety and the liquid crystal orientation moiety may be bound by an arbitrary organic chain such as those represented as (CH$_2$CH$_2$)$_n$ or (CH$_2$OCH$_2$)$_n$ (n represents a natural number). Further, in the liquid-crystalline molecule, the miscible moiety and the liquid crystal orientation moiety may be present as a side chain or may comprise the main chain within the molecular structure. Moreover, especially when the liquid-crystalline molecule consists of a polymer such as polysaccharide, two or more miscible moieties and liquid crystal orientation moieties that are the same or different may be present. Furthermore, the liquid-crystalline molecule may contain a polymerizable group such as methacryl group, acryl group or an epoxy group.

For example, by mixing the above-described organic molten salt and liquid-crystalline molecule, the liquid crystalline phase can be formed spontaneously in the organic molten salt through self assembly. In the mixture, the miscible moieties of the liquid-crystalline molecules interact and assemble to spontaneously form a stable organization.

The organic molten salt and the liquid-crystalline molecule may be mixed directly by fusion or may be mixed after being dissolved in a solvent. When mixed directly by fusion, the liquid-crystalline ionic conductor is obtained as a mixture; when a solvent is used, the organic molten salt and the liquid-crystalline molecule are respectively dissolved in an organic solvent, for example, alcohols such as ethanol, or chloroform, and these solutions are mixed to expedite uniform mixing, after which the solvent of the mixed solution is removed by evaporation, and the residual product is dried to obtain a liquid-crystalline ionic conductor. The solvent may be removed by heating at an appropriate temperature. For example, when chloroform is used as an organic solvent, the solvent can be removed rapidly by heating at approximately 60° C. Further, vacuum drying is also effective. Consequently, the liquid-crystalline ionic conductor which comprises an organic molten salt to which liquid-crystalline properties are imparted is obtained.

Figure 1:
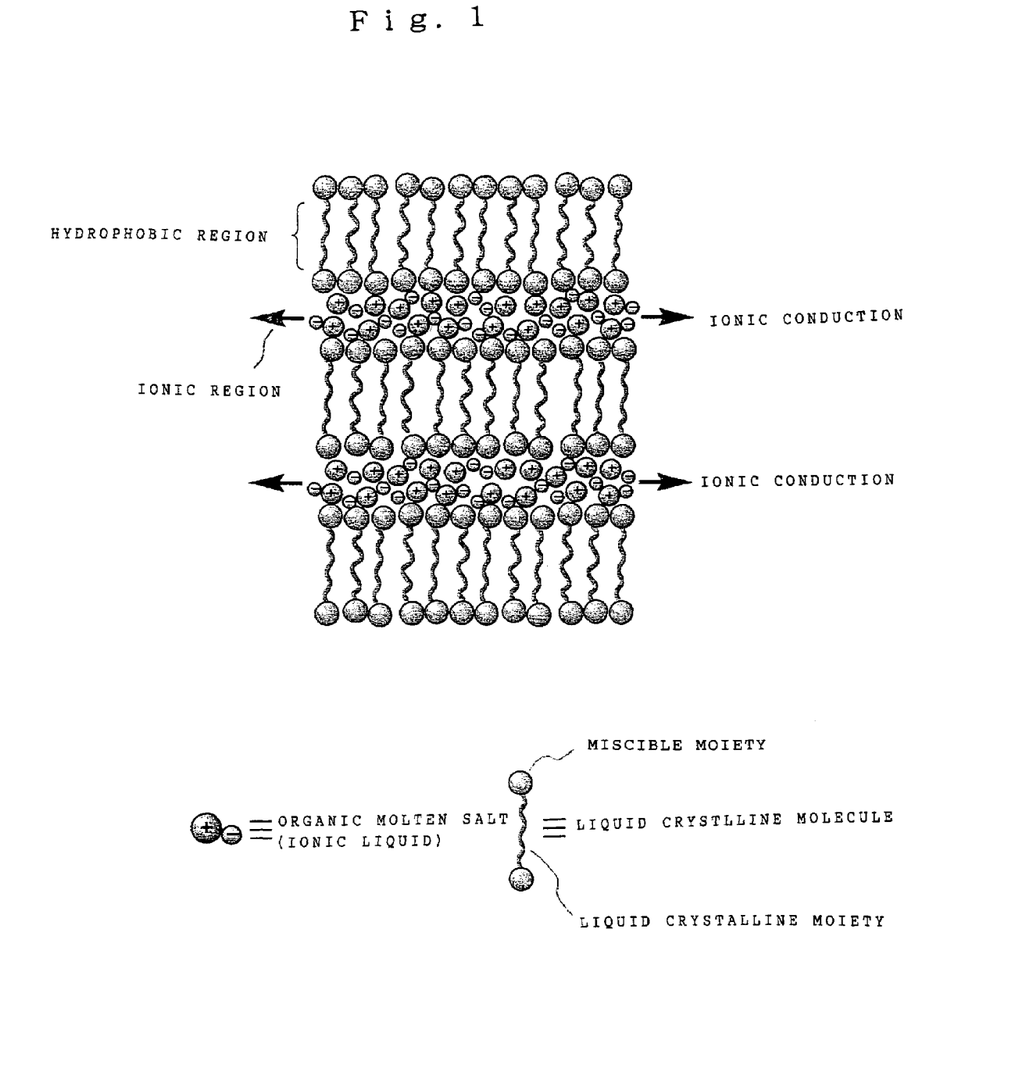
FIG. 1 is a schematic view exemplifying the structure of a liquid-crystalline ionic conductor in the invention of the present application.

The liquid-crystalline ionic conductor of the present invention has a structure, wherein, for example, the organic molten salt is assembled between layers of various types formed by the liquid-crystalline molecules. FIG. 1 is a schematic view that exemplifies a liquid-crystalline ionic conductor with such a structure, in which a smectic phase is formed by the liquid-crystalline molecules and the organic molten salt is assembled between layers thereof. The long axes of the liquid-crystalline molecules orient in a specific direction and interact to form a layered structure. The spaces between the layers show ionic conductivity owing to the organic molten salt present therein. That is, the present liquid-crystalline ionic conductor consists of an ionic conduction moiety (organic molten salt) and a non-ionic conduction moiety (liquid-crystalline molecule) assembled to form a layered structure in a nanometer level. Moreover, the liquid-crystalline ionic conductor exhibits anisotropy and the electric field responsiveness owing to the liquid-crystalline molecule.

By this assembly, the liquid-crystalline molecule exhibits liquid-crystalline properties. Even the liquid-crystalline molecules that do not exhibit liquid-crystalline properties on their own exhibit liquid-crystalline properties. Further, liquid-crystalline molecules that show liquid-crystalline properties on their own may show changes in their liquid-crystalline properties. For example, effects such as changing to a more thermally stable liquid crystalline phase, or broadening of the range of liquid crystal transition temperature, may be observed. Specifically, for example, a liquid-crystalline molecule that forms a columnar phase may form a layered structure when an organic molten salt is present in its cylinder, causing the liquid-crystalline properties of the liquid-crystalline ionic conductor to change. Further, with regard to the organic molten salt, its inherent properties such as high conductivity and free molecular mobility are not lost at all, even in the liquid-crystalline ionic conductor.

Furthermore, in the present invention, a high anisotropic ionic conductivity may also be realized by the formation of a cell or an oriented cell. This characteristic is especially adjuvant to their application to batteries for electric automobiles and the like.

Since the combination of the organic molten salt and the liquid-crystalline molecule is almost unlimited, it is possible to design a liquid-crystalline ionic conductor with the desired characteristics.

For example, by the assembly of a liquid-crystalline ionic conductor of the following formula:

(23)

wherein, R, $R^I$ and $R^{II}$ may each be the same or different, and represent a hydrogen atom, an alkyl group; for example $C_nH_{2n+1}$ (n=6 to 22), an alicyclic group, an aromatic group, an aralkyl group, a perfluoro group; for example, $C_nF_{2n+1}$ (n=6 to 22), $CH_2=CH-CO-O-$, $CH_2=C(COH_3)-CO-O-$, a benzyloxy group represented by the following formula

(24)

or the like, Y represents $-CO-O-$ or $-NH-CO-$, m=1 to 4, and Z represents any three of groups selected from the following formulas (25)

-continued with an organic molten salt, results in a liquid-crystalline ionic conductor with a smectic structure, together with but separately, a liquid-crystalline ionic conductor with a columnar structure or a cubic structure. In this case, as the organic molten salt, those containing cations such as those of the foregoing formula 1 to formula 6 are preferably listed.

The liquid-crystalline molecule compound represented by the foregoing formula 23 shows a group-of amphiphilic molecules. In this group, the symbols R, $R^I$ and $R^{II}$ are alkyl group, an aralkyl group or a perfluoroalkyl group which act as the ion-phobic moiety, the symbol Y is an ester bond or an amide bond, and the symbol Z is a hydroxyl group, an imidazole group, an imidazolium cationic group (including a polymerizable group) or a pyridinium cationic group (including a polymerizable group), which acts as the ion-philic moiety.

In the liquid-crystalline ionic conductor of the smectic structure, ionic conduction selectively appears in the layered organization only in the direction parallel to the layer. Meanwhile, in the liquid-crystalline ionic conductor of the columnar structure, ionic conduction selectively appears in the direction parallel to the column axis.

In this manner, an organic molten salt to which a desired liquid-crystalline property is imparted may be realized by the invention of the present application. In many reactions including enzyme reaction, high activity, high selectivity, and shortening of reaction time are realized in a state where the substrate molecules are regularly arranged or arrayed. Accordingly, by using the liquid-crystalline ionic conductor of the present invention in such a system, a reaction field that enables a regulated arrangement or array of the substrate molecules can be provided. On the other hand, the ionic conductivity can also be imparted to the liquid-crystalline material.

Consequently, the liquid-crystalline ionic conductor of the invention of the present application can provide a functional material that is extremely useful in various fields associated with the chemical industry, the electrochemical industry, electronic engineering, bioengineering and the like, as for example, (1) a reaction solvent that attains an anisotropic reaction field;

(2) a conductor that may transport ions anisotropically;

(3) a material for which the direction of ion-conduction may be controlled freely by electric field, (4) a selective permeation/interception material for a substance, based on liquid crystalline phase-liquid crystalline phase transition or liquid crystalline phase-isotropic phase transition; and

(5) a biomimetic material derived from a liquid crystal layer structure.

Hereinafter, the embodiments of the invention are illustrated more specifically by referring to the following Examples.

EXAMPLES

Example 1

Ethylmethylimidazolium tetrafluoroborate (hereinafter referred to as organic molten salt 1) was used as an organic molten salt, and 4,4'-bis(($\omega$-imidazol-1-yl)alkoxy)biphenyl as a liquid-crystalline molecule to be assembled therewith. The structures of these compounds are shown in the following formulas [formula 26] and [formula 27], and their transition temperatures are shown in Table 1. Incidentally, for 4,4'-bis(($\omega$-imidazol-1-yl)alkoxy)biphenyl, three types of substances (hereinafter referred to as liquid-crystalline molecules 1, 2 and 3 respectively) in which the carbon number n for the hydrocarbon chain in the formula was 6, 9 and 10, were used. Further, the transition temperature was measured using a polarization microscope fitted with a temperature-variable stage and a differential scanning calorimeter (DSC) in combination.

(26)

(27)

TABLE 1

| Substance | Transition temperature (° C.) | |
|---|---|---|
| Organic molten salt 1 | Heating step | Cr~15~I |
| | Cooling step | I~15~Cr |
| Liquid-crystalline molecule 1 (n = 6) | Heating step | Cr~91~I |
| | Cooling step | I~68~Cr |
| Liquid-crystalline molecule 2 (n = 9) | Heating step | Cr~87~I |
| | Cooling step | I~72~$S_A$~68~$S_C$~48~Cr |
| Liquid-crystalline molecule 3 (n = 10) | Heating step | C~102~I |
| | Cooling step | I~88~Cr |

Incidentally, in the table, symbol Cr indicates a crystal phase, I an isotropic phase, $S_A$ a smectic A phase, and $S_C$ a smectic C phase.

Liquid-crystalline molecule 2 (n=9) shows liquid-crystalline properties on its own, whereas liquid-crystalline molecule 1 (n=6) and liquid-crystalline molecule 3 (n=10) do not show liquid-crystalline properties by themselves. Further, organic molten salt 1 does not show liquid-crystalline properties either.

Predetermined amounts of the above substances were measured and dissolved in chloroform respectively. The solution of organic molten salt 1 and the solutions of liquid-crystalline molecules 1 to 3 were respectively mixed and stirred to form a uniform solution. This mixture was heated at 60° C. to remove the solvent by evaporation, and the residual paste-like substances were vacuum-dried for 2 hours to obtain assemblies 1 to 3.

Figure 2:
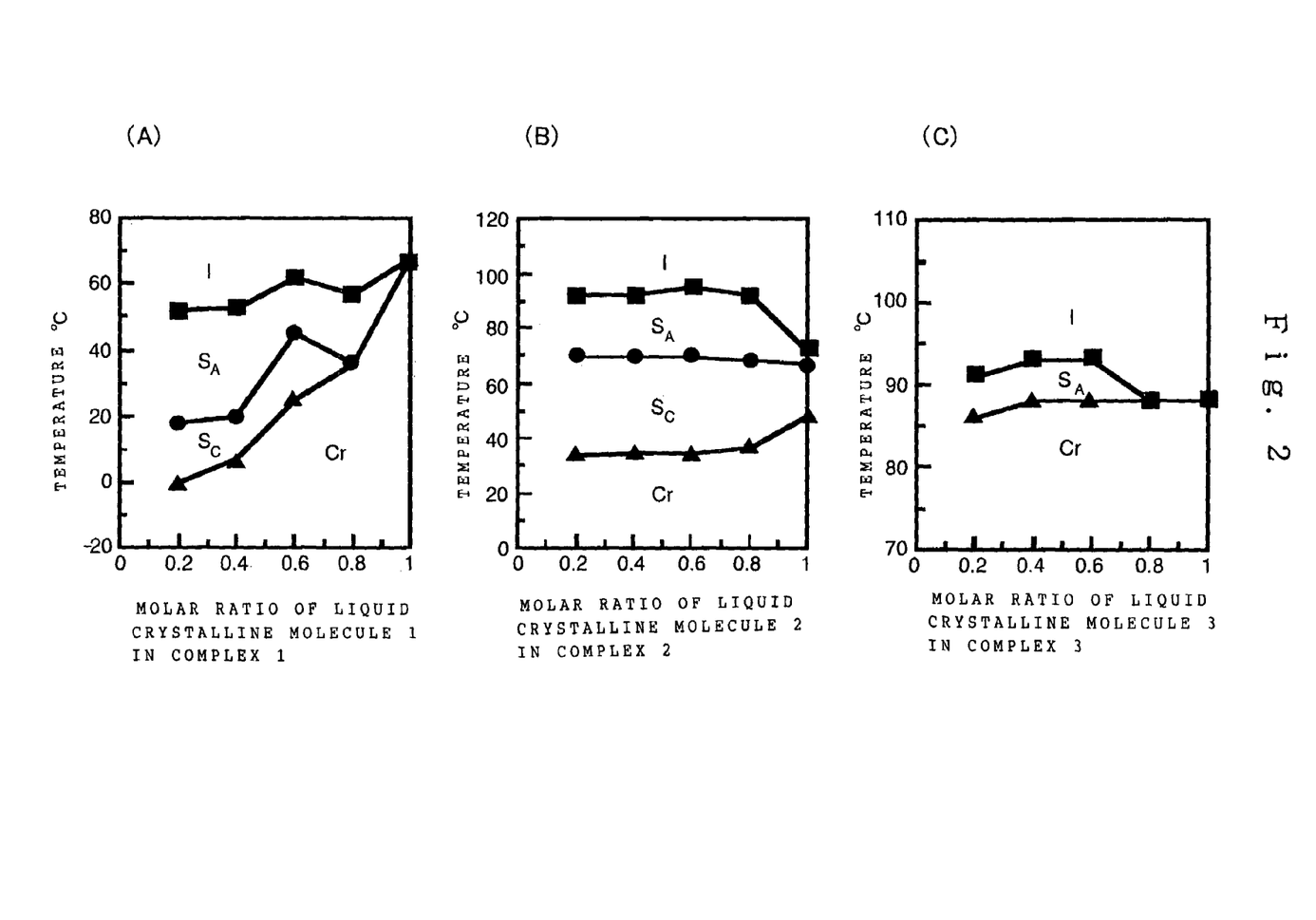
FIG. 2 is a graph that shows the relationship between the assembly formation ratio and the thermal phase transition temperature of the liquid-crystalline ionic conductors produced in the Example: (A) assembly 1, (B) assembly 2 and (C) assembly 3.

The relationship between the assembly formation ratio and the thermal phase transition temperature of the resulting assemblies 1 to 3 are shown in FIG. 2. It was identified that liquid-crystalline properties were exhibited for assembly 1 and assembly 3, even though they are comprised of liquid-crystalline-molecule 1 or liquid-crystalline molecule 3 neither of which show liquid-crystalline properties on its own and organic molten salt 1. Further, it was found that assembly 2 that comprises liquid-crystalline molecule 2, which inherently shows liquid-crystalline properties, maintains-its liquid-crystalline properties even after it is assembled with organic molten salt 1.

Moreover, it was found that assemblies 1 to 3 exhibit liquid-crystalline properties at any assembly formation ratio. Particularly, with respect to assembly 3, it was shown that liquid-crystalline properties were exhibited at a broader temperature range when the ratio of liquid-crystalline molecule 3 was smaller.

In view of the foregoing, it was indicated that liquid-crystalline properties can be imparted to the organic molten salt.

Example 2

Organic molten salt 1 in Example 1 and ethylmethylimidazolium hexafluorophosphate (hereinafter referred to as organic molten salt 2) were used as an organic molten salt, and two types of imidazolium-type surfactants (hereinafter referred to as liquid-crystalline molecule 4 and liquid-crystalline molecule 5) were used as liquid-crystalline molecules to be assembled therewith. The structures of organic molten salt 2, liquid-crystalline molecule 4 and liquid-crystalline molecule 5 are shown in the following [formula 28], [formula 29] and [formula 30], respectively.

(28)

(29)

(30)

The transition temperatures of organic molten salt 2, liquid-crystalline molecule 4 and liquid-crystalline molecule 5 are shown in Table 2.

TABLE 2

| Substance | Transition temperature (° C.) | |
|---|---|---|
| Organic molten salt 2 | Heating step | Cr~59~I |
| | Cooling step | I~6.5~Cr |
| Liquid-crystalline molecule 4 | Heating step | $S_X$~57~$S_A$~205~I |
| | Cooling step | I~203~$S_A$~55~$S_X$ |
| Liquid-crystalline molecule 5 | Heating step | C~81~$S_A$~165~I |
| | Cooling step | I~164~$S_A$~70~$S_X$ |

Incidentally, in the table, symbol Cr indicates a crystal phase, I an isotropic phase, $S_A$ a smectic A phase, $S_X$ a smectic X phase that is a high-order smectic phase closer to a crystal phase.

Liquid-crystalline molecule 4 [formula 29] and liquid-crystalline molecule 5 [formula 30] are substances that show smectic liquid-crystalline properties in a broad temperature range. Further, organic molten salt 2 [formula 28] does not show liquid-crystalline properties.

Figure 3:
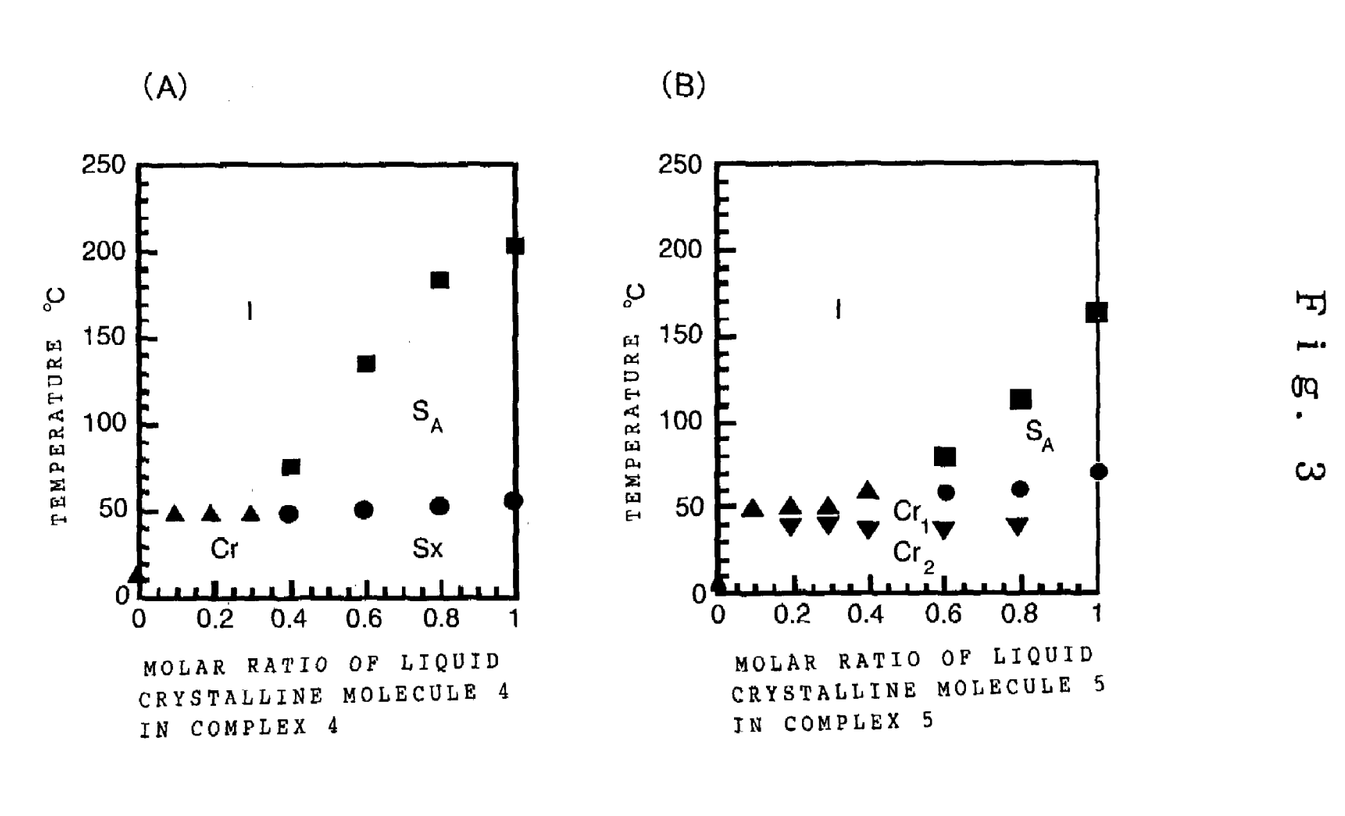
FIG. 3 is a graph that shows the relationship between the assembly formation ratio and the thermal phase transition temperature of the liquid-crystalline ionic conductors produced in the Example: (A) assembly 4 and (B) assembly 5.

These substances were dissolved in chloroform as in Example 1. The solution of organic molten salt 1 and the solution of liquid-crystalline molecule 4 were mixed, and the solution of organic molten salt 2 and the solution of liquid-crystalline molecule 5 were mixed to obtain assembly 4 and assembly 5. The relationship between the assembly formation ratio and the thermal phase transition temperature of the resulting assembly 4 and assembly 5 is shown in FIG. 3.

In assembly 4, it was found that liquid-crystalline molecule 4 has to be assembled at a molar ratio of 0.4 or more to exhibit liquid-crystalline properties. Further, it was shown that when the ratio of liquid-crystalline molecule 4 is 0.4 or more, the liquid crystal temperature range can be broadened even by a slight increase in its ratio. In assembly 5, it was found that liquid-crystalline molecule 5 has to be assembled at a molar ratio of 0.6 or more to exhibit liquid-crystalline properties.

In view of the foregoing, it was determined that in order to impart liquid-crystalline properties to the organic molten salt, adjustment such as the decrease in amount of the substance to be assembled is enabled by selecting appropriate types of ions.

Example 3

Organic molten salt 1 in Example 1 was used as an organic molten salt, and alkyl glycoside (liquid-crystalline molecule 6), ω-hydroxyalkyl glycoside (liquid-crystalline molecule 7) and dialkyl glycoside (liquid-crystalline molecule 8) were used as liquid-crystalline molecules to be assembled therewith. The structures of liquid-crystalline molecules 6 to 8 are shown in the following [formula 31], [formula 32] and [formula 33].

(31)

(32)

(33)

These substances were assembled as in Example 1 to obtain assemblies 6 to 8. These assemblies were subjected to X-ray diffraction measurement and observation with a polarization microscope. Consequently, it was identified that assembly 6 and assembly 7 show smectic liquid-crystalline properties and self-assemble to form a layered structure at the nanometer level. Meanwhile, it was identified that assembly 8 shows hexagonal columnar liquid-crystalline properties and has a specific structure in which organic molten salt 1 is positioned in the center of the columnar structure to form a layer.

Example 4

Organic molten salt 3 and liquid-crystalline molecule 9 represented by the following [formula 34] and [formula 35] respectively were mixed at various ratios to obtain assemblies. The liquid crystal transition temperature of liquid-crystalline molecule 9 is shown in Table 3.

(34)

(35)

TABLE 3

| Substance | | Transition temperature (° C.) |
|---|---|---|
| Liquid-crystalline molecule 9 | Heating step | Cr~198~$S_B$~204~N~207~I |
| | Cooling step | I~208~N~202~$S_B$~171~Cr |

Incidentally, in the table, symbol Cr indicates a crystal phase, I an isotropic phase, SB a smectic B phase and N a nematic phase.

It was identified that all of the assemblies develop a smectic A phase and the liquid crystal temperature range thereof is broadened. It was identified that the transition temperature from the smectic A phase to the isotropic phase is increased by approximately 50° C. It was further found that while liquid-crystalline molecule 9 crystallizes on its own, it vitrifies without crystallization when formed into an assembly with organic molten salt 3.

Example 5

<A> Organic molten salt 3 [formula 34] in Example 4 and liquid-crystalline molecule 10 represented by the following [formula 36] were mixed to obtain an assembly. Liquid-crystalline molecule 10 is a substance showing a hexagonal columnar liquid crystalline phase.

(36)

The resulting assembly changed into a smectic liquid crystalline phase. It was further identified that the liquid crystal temperature range broadened.

Figure 4:
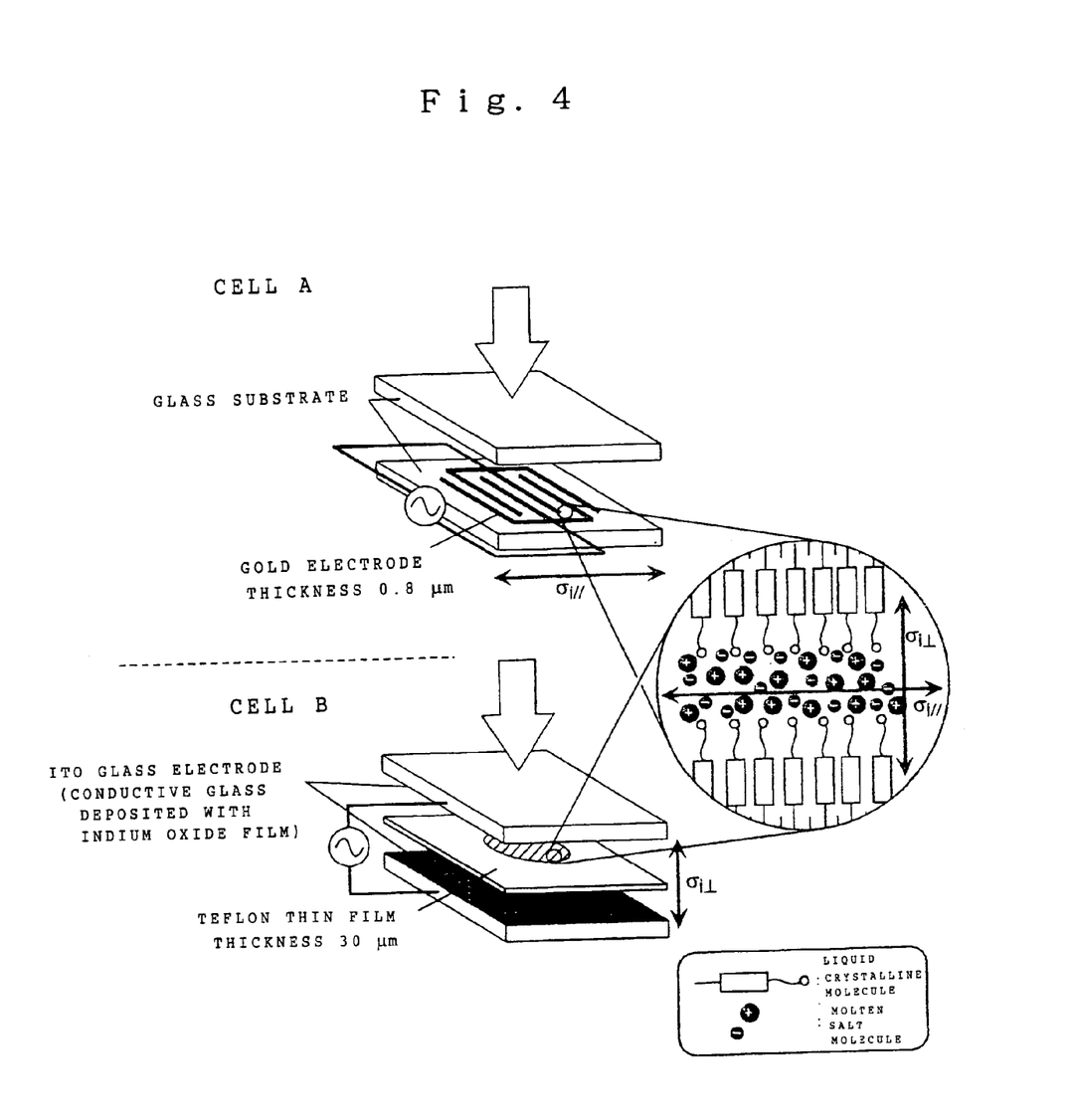
FIG. 4 is a schematic view that shows the system used for measuring anisotropic ionic conductivity.

<B> Anisotropic ionic conduction was measured for the smectic liquid-crystalline assembly obtained by mixing liquid-crystalline molecule 10 [formula 36] with organic molten salt 3 [formula 34] at a molar ratio of 1:1, FIG. 4 shows a schematic view of the system used for the measurement.

A heat-molten assembly (obtained by heating on a temperature-adjustable hot plate at 200° C.) was placed inside each of two types of glass cells A (top left in FIG. 4) and B (lower left in FIG. 4) fitted with electrodes as shown in FIG. 4. The assemblies were allowed to cool slowly to approximately 25° C., whereby the smectic liquid-crystalline assembly spontaneously formed homeotropic orientation (meaning the axes of liquid-crystalline molecules were arrayed optically positively perpendicularly on the bottom of the cell) inside the cell. This was identified by observation with an orthoscope and a conoscope in polarization microscope observation. That is, optical anisotropy was not observed and a dark field was obtained as the orthoscope image, while an isogyre (dark cross zone) was obtained as a conoscope image; thus the liquid-crystalline assembly was determined to be homeotropically oriented. Accordingly, ionic conductivity in a direction parallel to the layer of the smectic liquid crystal was measured in cell A, and ionic conductivity in a direction perpendicular to the layer of the smectic liquid crystal was measured in cell B. The use of these cells A and B enables the detection of ionic conductivities in different directions for the foregoing liquid-crystalline ionic conductor, namely, the anisotropic ionic conductivity. An AC impedance method (method by which movement of ions is detected as a resistance value by applying AC electric fields of various frequency) was employed as a method of measuring ionic conductivity. By using this method, the ionic conduction behavior inside a measurement sample can be evaluated quantitatively, and the effect of specific ionic conduction behavior that occurs in the vicinity of the electrode interface can be removed. Furthermore, in addition to the anisotropic conductivity behavior of the ionic conductor that characteristically shows liquid-crystalline properties, the change in ionic conductivity caused by the liquid crystalline phase transition accompanied by changes in temperature was also evaluated.

Figure 5:
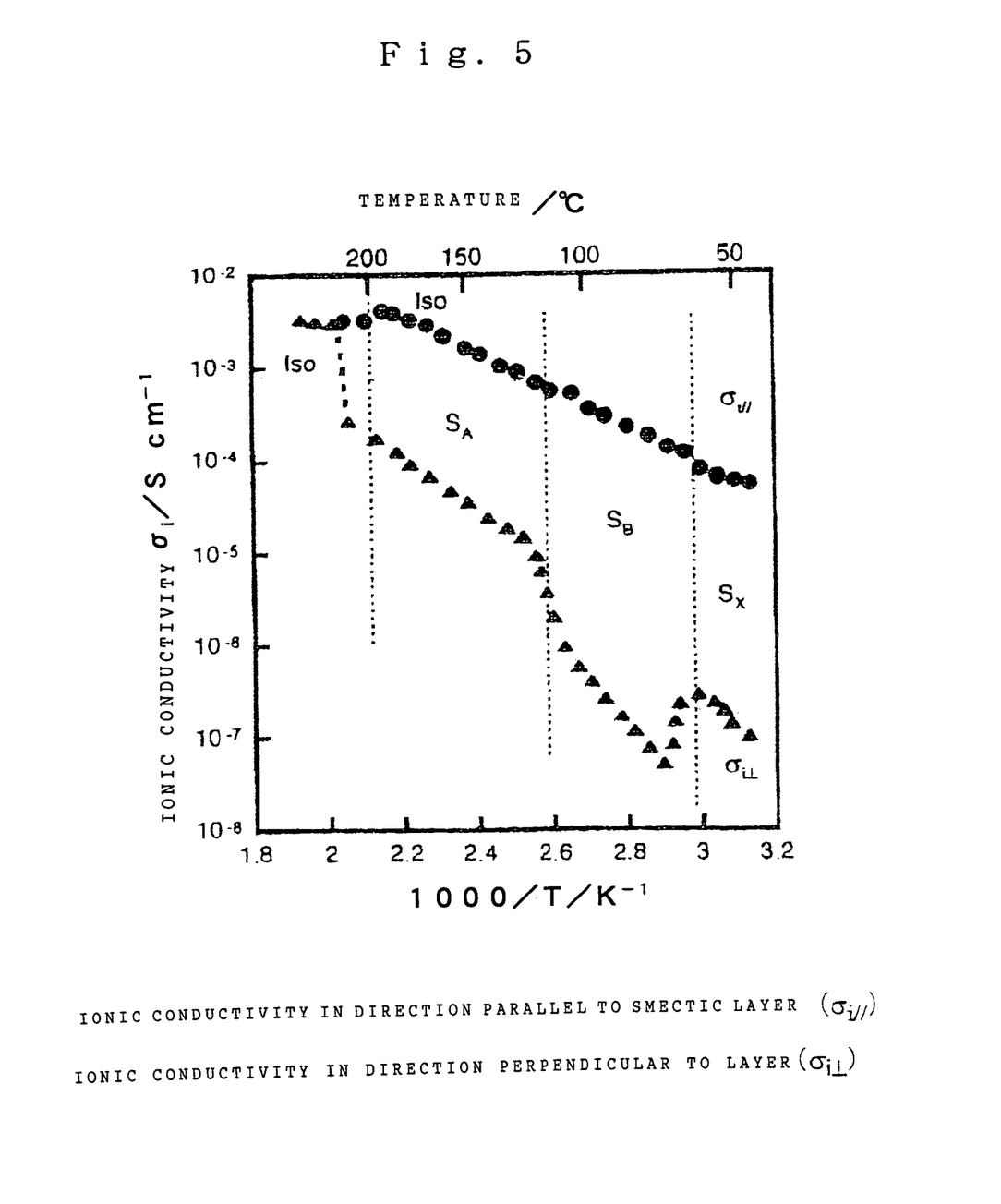
FIG. 5 is a graph showing the results of anisotropic ionic conductivity measurement in Example 5 <B>.

The results anisotropic ionic conductivity measurement are shown in FIG. 5.

As a result, the following were identified:

(1) It was found that the ionic conductivity in the direction parallel to the smectic layer was higher than the ionic conductivity in the direction perpendicular to the layer, indicating that the conductor functions as an anisotropic ionic conductor.

(2) The highest ionic conductivity showed a value of $4.1 \times 10^{-3}$ Scm$^{-1}$ in the smectic A (S$_A$) phase at 192° C. Further, the value of anisotropy of the ionic conductivity (ionic conductivity in the direction parallel to the layer/ionic conductivity in the direction perpendicular to the layer) at this temperature was 29.

(3) The maximum value of anisotropy of the ionic conductivity shown by the assembly was $3.1 \times 10^3$ in the smectic B (SB) phase of 73° C.

(4) It was found that the ionic conductivity in the direction perpendicular to the layer is abruptly increased during the transition from SA to Iso.

(5) The difference in conductivity observed when using cells A and B disappeared when the liquid crystal order structure of the liquid-crystalline assembly was lost and the phase was changed to the isotropic phase (Iso).

Example 6

The anisotropic ionic conduction was measured for the smectic liquid-crystalline assembly obtained by mixing liquid-crystalline molecule 11 represented by the following [formula 37] with the foregoing organic molten salt 3 [formula 34] at a molar ratio of 1:1. The measuring system was the same as that shown in FIG. 4 described in Example 5.

(37)

Figure 6:
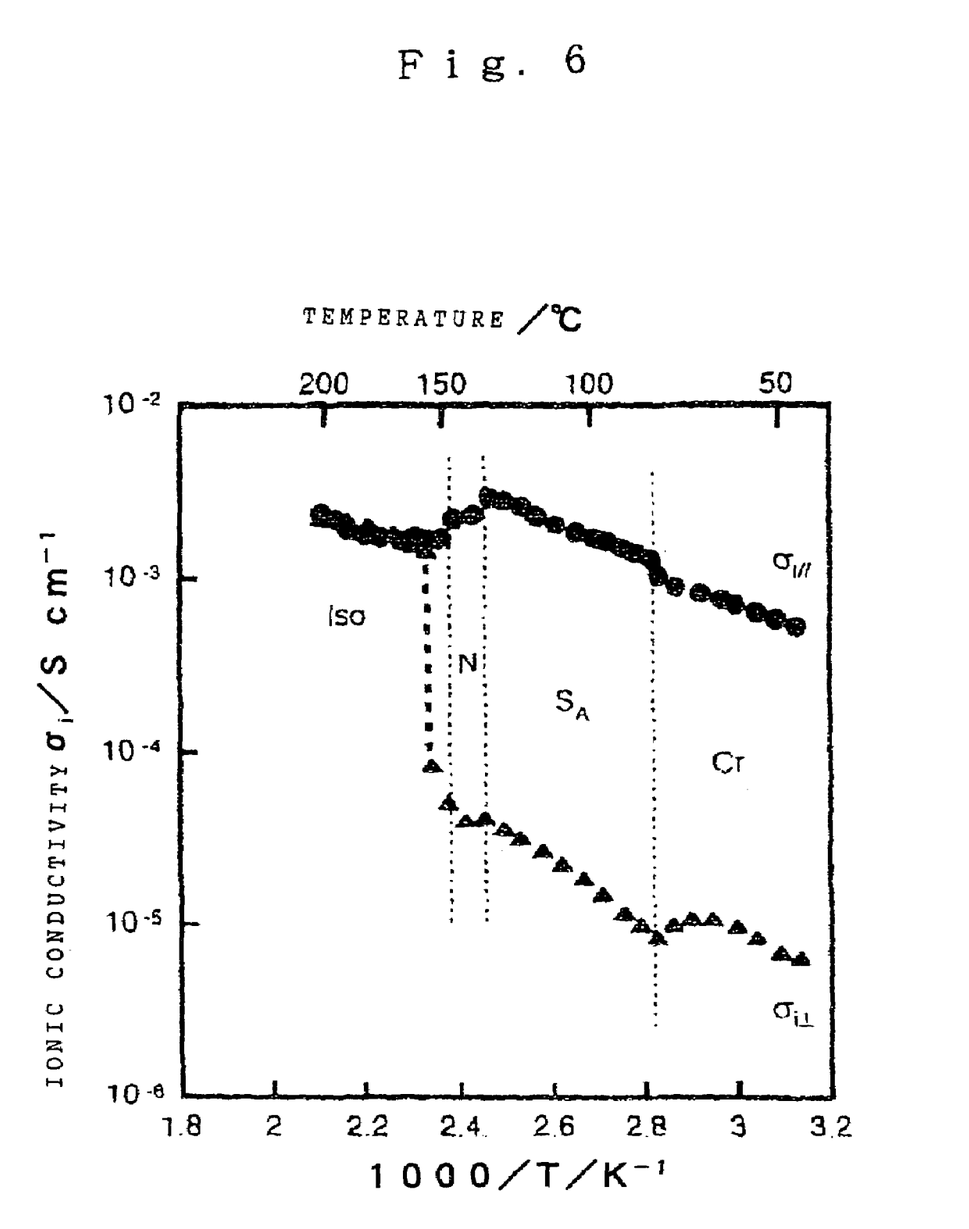
FIG. 6 is a graph showing results of anisotropic ionic conductivity measurement in Example 6.

The results of measuring the anisotropic ionic conductivity are shown in FIG. 6.

As a result, the following were identified:

(1) It was found that the ionic conductivity in the direction parallel to the smectic layer was higher than the ionic conductivity in the direction perpendicular to the layer, indicating that the conductor functions as an anisotropic ionic conductor.

(2) The highest ionic conductivity showed a value of $2.8 \times 10^{-3}$ Scm$^{-1}$ in the smectic A (SA) phase at 132° C. Further, the value of anisotropy of the ionic conductivity at this temperature was 82.

(3) Even though the assembly was in a crystalline state (Cr), the ionic conductivity showed a high anisotropy.

(4) It was found that with the transition from S$_A$ to a nematic (N) phase and further to an isotropic phase (Iso), the ionic conductivity in the direction parallel to the layer is decreased. Meanwhile, it was identified that the ionic conductivity in the direction perpendicular to the layer is abruptly increased with the transition from N to Iso.

(5) The difference in conductivity observed when using cells A and B disappeared when the liquid crystal order structure of the liquid-crystalline assembly was lost and the phase was changed to the isotropic phase (Iso).

Example 7

The anisotropic ionic conduction was measured for the columnar liquid-crystalline assembly obtained by mixing a compound represented by the following formula (38)

as the liquid-crystalline molecule belonging to the foregoing [formula 24] (corresponding to a compound of [formula 24] in which symbols R and R$^I$ are C$_{12}$H$_{25}$, R$^{II}$ is H, Y is COO and Z is a hydroxyl group) with the organic molten salt of [formula 29] used in Example 2 at a molar ratio of 4:1.

Figure 7:
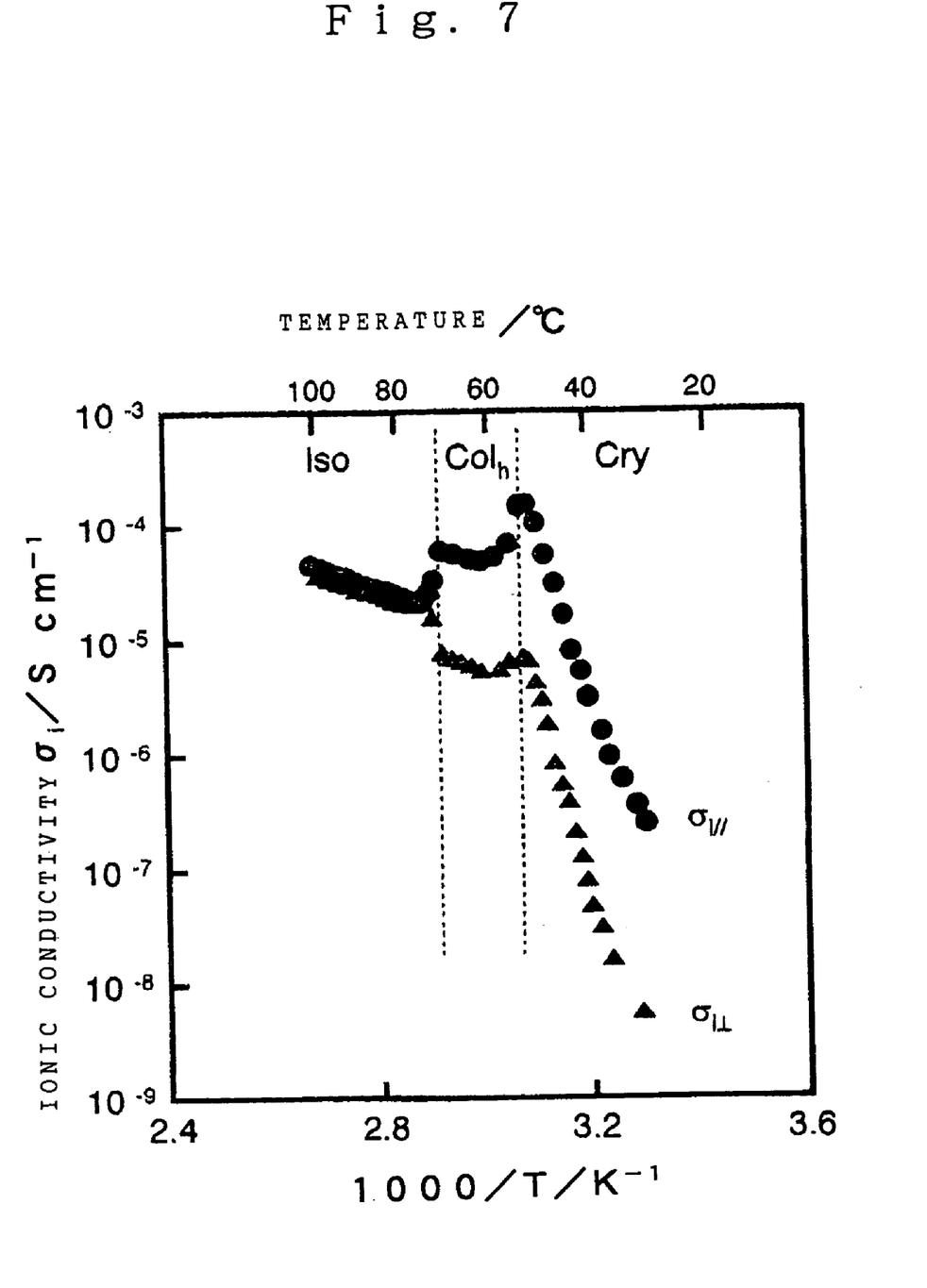
FIG. 7 is a graph showing results of anisotropic ionic conductivity measurement in Example 7.

The results of measuring the anisotropic ionic conduction are shown in FIG. 7.

From FIG. 7, the following facts were found with respect to this liquid-crystalline assembly.

(1) The ionic conductivity (●) in the direction parallel to the column axis is higher by approximately one digit than the ionic conductivity (o) in the direction perpendicular to the column axis.

(2) The value of anisotropy of the ionic conductivity becomes maximum with the transition from the liquid crystalline phase to the columnar liquid crystalline phase.

(3) Since the assembly shows anisotropic ionic conductivity in the liquid crystalline phase, a one-dimensional path of efficiently transporting ions in the column axial direction is formed in the-liquid crystalline phase also.

(4) When the assembly is changed from the liquid crystalline phase to the isotropic phase, the anisotropic ionic conductivity is lost and the isotropic ionic conductivity is shown.

Of course, the invention is not limited to the foregoing examples, and it goes without saying that various modifications are possible in the details.

INDUSTRIAL APPLICABILITY

As has been thus far described, this invention provides a novel liquid-crystalline ionic conductor which is useful in the electric, electronic, chemical and bioengineering fields and the like as an anisotropic reaction solvent, ionic conductor, electric field-responsive conductor or the like, as well as a method for producing the same.

The invention claimed is:

1. A liquid-crystalline ionic conductor, comprising an organic molten salt and a liquid-crystalline molecule, which are mixed and assembled to form a smectic structure.

2. The liquid-crystalline ionic conductor of claim 1, wherein the organic molten salt is assembled between layers of the liquid-crystalline molecules.

3. The liquid-crystalline ionic conductor of claim 1, which is in the form of a cell or an oriented cell.

4. The liquid-crystalline ionic conductor of claim 1, wherein the liquid-crystalline molecule comprises a moiety that is miscible to the organic molten salt and a moiety that shows liquid-crystalline orientation.

5. A method for producing a liquid-crystalline ionic conductor which comprises mixing an organic molten salt with a liquid-crystalline molecule, wherein the liquid-crystalline molecule forms a smectic structure.

6. A liquid-crystalline ionic conductor, comprising an organic molten salt and a liquid-crystalline molecule, which are mixed and assembled to form a columnar structure or a cubic structure.

7. A method for producing a liquid-crystalline ionic conductor which comprises mixing an organic molten salt with a liquid-crystalline molecule, wherein the liquid-crystalline molecule forms a columnar structure or a cubic structure.

8. The liquid-crystalline ionic conductor of claim 6, wherein the organic molten salt is assembled between layers of the liquid-crystalline molecules.

9. The liquid-crystalline ionic conductor of claim 6, which is in the form of a cell or an oriented cell.

* * * * *